United States Patent
Hadley et al.

(10) Patent No.: US 9,439,353 B2
(45) Date of Patent: Sep. 13, 2016

(54) PULL-TYPE COTTON HARVESTER AND BALER

(75) Inventors: Bruce A. Hadley, Ephrata, PA (US);
Kevin S. Richman, Plainfield, IL (US);
Steven E. Gaedy, New Holland, PA (US)

(73) Assignee: CNH Industrial America LLC, New Holland, PA (US)

( * ) Notice: Subject to any disclaimer, the term of this patent is extended or adjusted under 35 U.S.C. 154(b) by 463 days.

(21) Appl. No.: 13/637,205

(22) PCT Filed: Mar. 25, 2011

(86) PCT No.: PCT/US2011/030043
§ 371 (c)(1),
(2), (4) Date: Sep. 25, 2012

(87) PCT Pub. No.: WO2011/119991
PCT Pub. Date: Sep. 29, 2011

(65) Prior Publication Data
US 2013/0014482 A1     Jan. 17, 2013

Related U.S. Application Data

(60) Provisional application No. 61/341,037, filed on Mar. 25, 2010.

(51) Int. Cl.
*A01D 46/08* (2006.01)
(52) U.S. Cl.
CPC .................................. *A01D 46/08* (2013.01)
(58) Field of Classification Search
CPC .................................................... A01D 46/084

USPC ........................................ 56/28, 16.1, 34, 36
See application file for complete search history.

(56) References Cited

U.S. PATENT DOCUMENTS

| | | | | |
|---|---|---|---|---|
| 2,517,063 | A | * | 8/1950 | Wallace ............................. 56/34 |
| 2,526,535 | A | * | 10/1950 | Brown .............................. 19/38 |
| 2,529,358 | A | | 11/1950 | Slater |
| 2,672,719 | A | * | 3/1954 | Wagnon ............................ 56/30 |
| 2,707,364 | A | * | 5/1955 | Wagnon ............................ 56/30 |
| 2,720,073 | A | | 10/1955 | Freeman et al. |
| 2,833,103 | A | * | 5/1958 | Davenport ........................ 56/44 |
| 3,151,431 | A | * | 10/1964 | Daugherty ........................ 56/28 |
| 3,233,393 | A | | 2/1966 | Lundell |
| 3,295,299 | A | | 1/1967 | Brady et al. |
| 3,314,221 | A | | 4/1967 | Forbes |
| 4,275,550 | A | * | 6/1981 | Swenson et al. ................ 56/341 |
| 4,470,245 | A | * | 9/1984 | Agadi ............................... 56/28 |
| 4,603,543 | A | | 8/1986 | Cornell |
| 5,009,062 | A | * | 4/1991 | Urich et al. ..................... 56/341 |

(Continued)

*Primary Examiner* — Thomas B Will
*Assistant Examiner* — Mai Nguyen
(74) *Attorney, Agent, or Firm* — Patrick M. Sheldrake

(57) ABSTRACT

A cotton harvester and baler (20) to be towed by a vehicle (24), carries at least one mechanized cotton picking unit (30), a mechanized cotton baler (32) having packing apparatus (76) for compacting the picked cotton into bales (84) which are successively discharged. Cotton conveying apparatus (34) extends between the picking unit or units (30) and the baler (32), for receiving the picked cotton and conveying it to a baling chamber (72) of the baler (32) for compaction by the packing apparatus (76). The conveying apparatus (34) can comprise all mechanical, all pneumatic, or a combination of mechanical and pneumatic apparatus. The picking unit or units (30) can be removed to allow picking up and baling material such as straw or hay.

11 Claims, 11 Drawing Sheets

(56) References Cited

U.S. PATENT DOCUMENTS

| | | | |
|---|---|---|---|
| 5,377,481 A * | 1/1995 | Sibley et al. | 56/341 |
| 5,964,078 A * | 10/1999 | Robinson | 56/13.5 |
| 7,043,892 B1 * | 5/2006 | Kessler | 56/341 |
| 7,370,460 B1 * | 5/2008 | Philips et al. | 56/28 |
| 2007/0234696 A1 * | 10/2007 | Pilatti | 56/28 |

* cited by examiner

PULL-TYPE COTTON HARVESTER AND BALER

This application is the US National Stage filing of International Application Serial No. PCT/US2011/030043 filed on Mar. 25, 2011 which claims priority to U.S. Provisional Application No. 61/341,037, filed Mar. 25, 2010, each of which is incorporated herein by reference in its entirety.

TECHNICAL FIELD

The present invention relates generally to a cotton harvester and, more particularly, to a pull-type harvester and baler combination.

BACKGROUND ART

U.S. Provisional Application No. 61/341,037, filed Mar. 25, 2010, is incorporated herein in its entirety by reference.

Much of the world cotton crop is produced on small farms or in impoverished areas such that the cost of self-propelled cotton harvesting machines cannot be afforded or justified. However, they may have, or have access to, a small to medium size tractor. Also, some farms, for instance, in India and China, have confined areas or small plots of cotton that make maneuvering a larger self-propelled harvester difficult.

Additionally, for many such farms, there may be a lack of capability to handle and transport large cotton modules or larger bales.

Reference U.S. Pat. No. 7,370,460 B1, which discloses a drawn cotton picker. Shortcomings of that picker include that it fails to provide a manner of packaging the picked cotton, and includes an elevated cotton collection basket that raises the center of gravity of the picker, which could limit use on uneven ground.

It is known to provide detachable cotton picking apparatus and collection means for tractors. However, the picking apparatus mounts to the rear of the tractor, requiring rearward travel when picking, and the collection apparatus is located above the tractor, thereby raising the center of gravity and increasing danger of roll over.

Therefore, what is sought is a cotton harvester of a pull-type or towable by a small or medium size tractor, which overcomes one or more of the shortcomings set forth above.

SUMMARY OF THE INVENTION

What is disclosed is a cotton harvester of a pull-type or towable by a small or medium size tractor, which overcomes one or more of the shortcomings set forth above.

According to a preferred aspect of the invention, the harvester will connect to the draw hitch of tractor sizes able to pull the load and drive the power load requirements needed for the harvesting and baling operation. The invention will preferably include one to three mechanized cotton harvesting picking units including drum assemblies, integrated with a small square baler, on a common support frame. Preferably, the entire baler frame would raise and lower the drum assemblies into the crop, for instance, with a hydraulic cylinder at each of the wheels supporting the harvester. The drum or drums of the picking unit or units could be configured in a dual arrangement to allow picking from both sides of plants, or could be single rotor for picking from one side only, for reduced cost and power requirements, and lighter weight. The tractor rear power takeoff would be utilized to drive the drums, either directly, via a drive shafts or shafts, or the like, or hydraulic or other motors could be utilized. A conveyor, auger or another form of mechanical mechanism would be used to move the cotton from doffers of the picking unit or units to the baling chamber suitable for containing and compacting or packing cotton. Or an electrical or hydraulic driven fan would blow the harvest cotton into the baling chamber. The packed bale of cotton would then be pushed through the chamber and tied using two or three wire wraps or other suitable packaging. The wire wrapped or other packaged bale would then be discharged from the wrapping chamber onto the ground or other surface below or onto a wagon or other receiving vehicle.

According to a preferred aspect of the invention, the support frame will be supported on wheels or tracks for movement over the ground and configured to be connected to a tow vehicle by a conventional hitch, to provide a relatively small turning radius and maneuverability. The support frame will carry at least one mechanized cotton picking unit configured for receiving standing cotton plants and harvesting the cotton therefrom. The baler includes an internal baling chamber adapted for receiving the picked cotton, compacting apparatus configured for compacting or packing the cotton within the baling chamber into unitary bales, and successively discharging the bales from the chamber, and the tying or other packaging apparatus. The harvester includes cotton conveying apparatus extending between the at least one picking unit and the baler, configured and operable for receiving the picked cotton from the picking unit or units and conveying the received cotton to the baling chamber of the baler for compaction by the compacting apparatus.

According to an exemplary aspect of the invention, the cotton conveying apparatus includes a first conveyor element disposed for receiving the picked cotton from the picking unit or units, and configured and operable for conveying it rearwardly. A second conveyor element is disposed for receiving the cotton, and is configured and operable for conveying the picked cotton sidewardly into the baling chamber of the baler. As a further example, the first conveyor element can include a platform disposed for receiving the picked cotton from the picking unit or units, and moving rakes configured and operable for moving the picked cotton rearwardly over the platform. As another example, the second conveyor element can comprise an auger. As still another example, the second conveyor can comprise rotary feeder apparatus including at least one rotatable feeder rotor configured and operable for feeding the picked cotton to at least one moving packing fork configured and operable for conveying the picked cotton into the baling chamber. As a further example, the cotton conveying apparatus can comprise a pneumatic conveyor.

According to another preferred aspect of the invention, the at least one cotton picking unit comprises at least one rotary cotton harvesting or rotatable picking drum assembly including a plurality of outwardly projecting fingers disposed beside a crop flow channel through the picking unit for removing the cotton from the cotton plants as they pass through the channel, and doffers for removing the picked cotton from the fingers in the well known manner. This enables picking the cotton from opposite sides of the plants. Alternatively, the picking unit or units can include a drum assembly on just one side of the channel for picking from one side of the plants. As another preferred aspect of the invention, the harvester can include two or three of the picking units.

To pull the harvester and baler of the invention, any suitable apparatus can be used. As a non-limiting example, a center pivot tongue can be utilized that allows offset for appropriate row alignment, maneuverability and steering on headlands and turn rows.

As an alternative to raising and lowering the picking units and baler jointly, the picking units can be mounted on an adjustable lift arm mechanism, to provide ability to adjust picking unit height and side by side spacing when more than one unit is carried.

As an optional feature of the invention, the picking unit or units can be removable, to allow conversion of the harvester to more of a conventional baler, able to pick up straw, hay, or other cut plants, from the ground.

As another optional feature, the harvester and baler can include an on-board power plant such as a petrol or diesel powered internal combustion engine for powering the harvesting and baling apparatus, and to enable pulling using a draught animal or animals, such as mules, oxen, or the like.

DETAILED DESCRIPTION OF THE INVENTION

Figure 1:
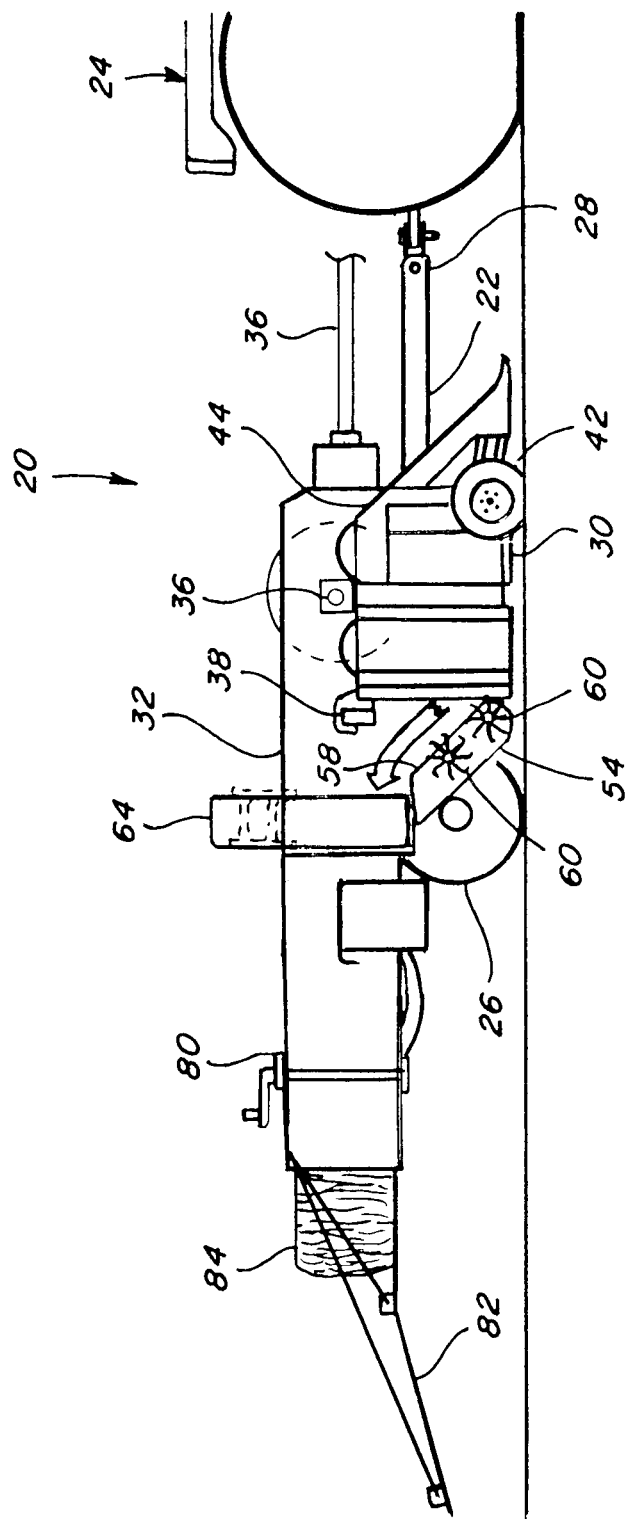
FIG. 1 is a simplified side view of one embodiment of a cotton harvester and baler constructed and operable according to the invention, shown being towed by a tractor.

Referring now to FIG. 1, therein is shown a cotton harvester and baler 20 constructed and operable according to the present invention. Harvester and baler 20 has a support frame 22 which can comprise a chassis type of a suitable material, such as steel tubing, and/or a unitary structure of a baler and other aspects of the invention, adapted to be towed or pulled by a suitably powerful tow vehicle, such as tractor 24 illustrated. In this capacity, support frame 22 includes wheels 26 (FIG. 3) on opposite sides thereof, and an elongate tongue 28 configured for attachment to a towing vehicle, such as tractor 24, for forward movement over a field containing standing cotton plants.

Support frame 22 is configured for carrying at least one mechanized cotton picking unit 30, in a forwardly facing orientation as shown. Frame 22 carries a mechanized baler 32 beside picking unit or units 30, for instance, on a suitable conventional towed baler chassis that can be adapted for carrying the cotton picking unit or units 30, and cotton conveying apparatus 34, extending between picking unit or units 30, and baler 32. Picking unit or units 30, baler 32, and conveying apparatus 34 are suitably powered, for instance, via drive shafts 36 connecting with a power takeoff of tractor 24, or other towing vehicle.

Figure 11:
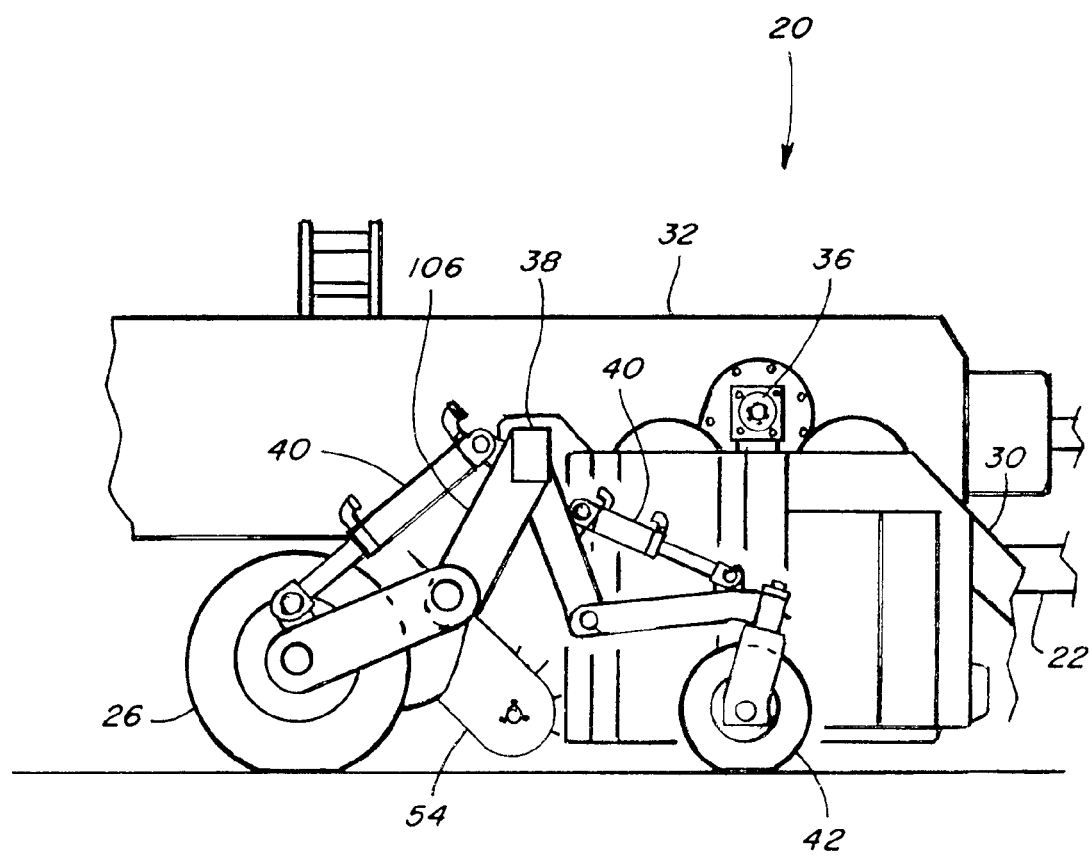
FIG. 11 is a fragmentary side view of the cotton harvester and baler of the invention showing height adjusting apparatus thereof.

Referring also to FIG. 11, support frame 22 is shown including a sidewardly projecting tool bar 38 configured for supporting picking unit or units 30. Support frame 22 can be connected to wheels 26 by adjustable lift arms 106 including suitable drivers 40, operable for adjusting the height or elevation of harvester and baler 20 in its entirety, or to allow adjusting the elevation of the picking unit or units 30 independently. As another optional feature, picking unit or units 30 can include one or more support wheels 42, for contacting the ground or other surface therebelow, for partially supporting the unit or units. Additional drivers 40 and lift arms 106 can be provided in connection with wheels 42, for making the height adjustments. Here also, harvester and baler 20 is shown including two picking units 30, but it can alternatively carry just one or three or more units, as desired or required for a particular application. Picking units 30 can be mounted on the tool bar so as to be movable sidewardly relative to support frame 22 to adjust position relative to the centerline of the towing vehicle, and also the spacing between units 22, for adjusting to a particular cotton plant row configuration.

Figure 2:
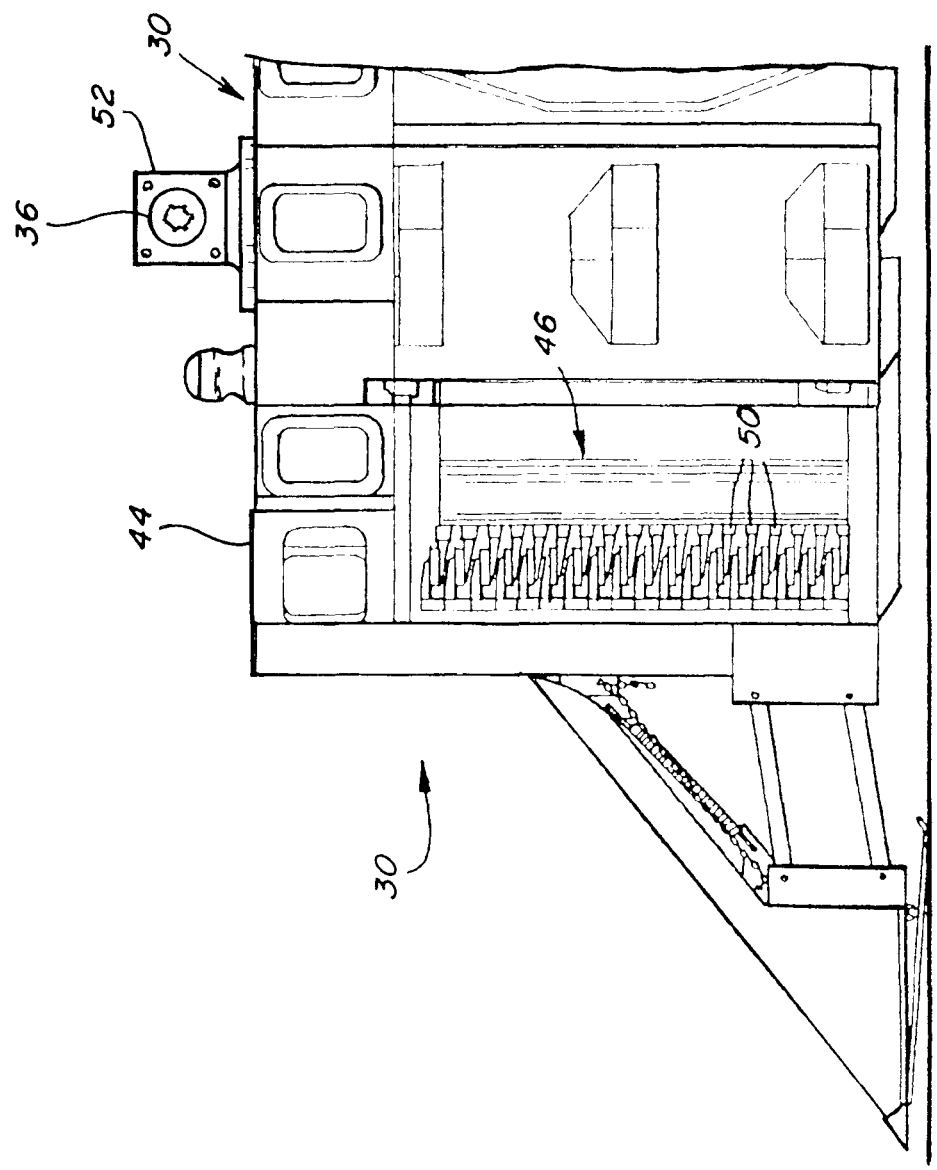
FIG. 2 is a side view of a representative cotton picking unit of the invention of FIG. 1.
Figure 3:
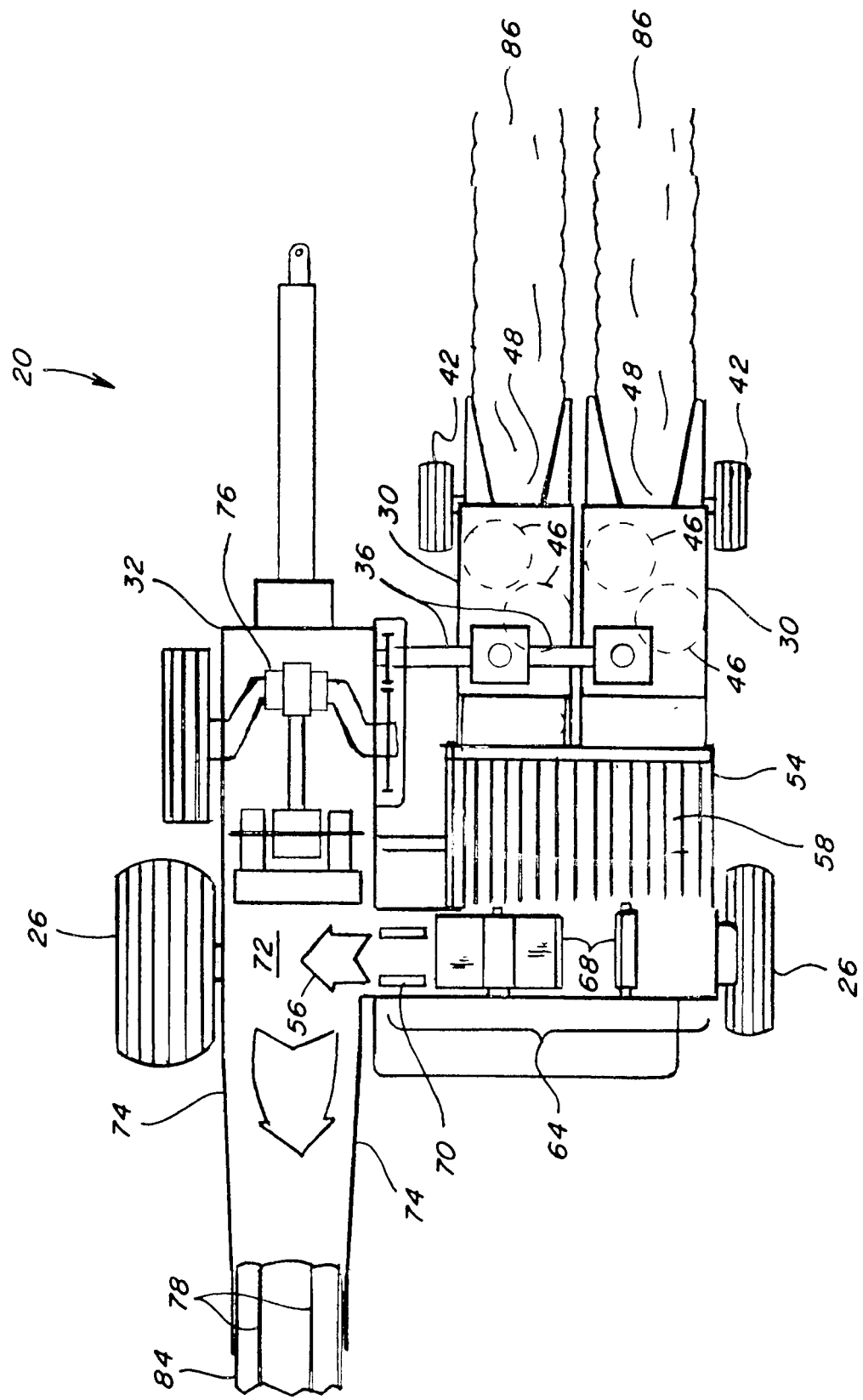
FIG. 3 is a simplified schematic top view of the invention of FIG. 1, illustrating aspects of operation thereof.

Referring also to FIGS. 2 and 3, each of the picking units 30 is of well known construction, including an enclosure 44 housing a pair of upstanding picker rotor drum assemblies 46, on opposite sides of a plant channel 48 sized and shaped for receiving cotton plants in succession. Enclosure 44 includes vertical plant compressor sheets on opposite sides of channel 48 for laterally compressing the plants in the well known manner for passage through channel 48. Each picker rotor drum assembly 46 includes a plurality of upstanding columns including sidewardly projecting picking fingers 50 that rotate about axes therethrough, for passage through plants in channel 48, for removing cotton from bolls of the plants. Each picking unit additionally includes doffers which remove the picked cotton from the picking fingers 50, also in the well known manner. Rotor drum assemblies 46 can be driven in any suitable manner, here, by gear boxes 52 driven by a drive shaft 36. The cotton then can either fall within the rear of enclosure 44, or be blown therefrom by a flow of air, depending on the configuration of cotton conveying apparatus 34, as will be disclosed. Here, it should be noted that although picking units 30 are illustrated as configured to have a two sided picking capability, alternatively, one or both could be configured to include picking apparatus on just one side of plant channel 48, if desired or required for cost, weight, and power consumption reduction, as well as other reasons. Suitable picking units 30 for use with the invention are available from Case IH Agriculture, of Racine, Wis. USA and other agricultural equipment providers.

Figure 4:
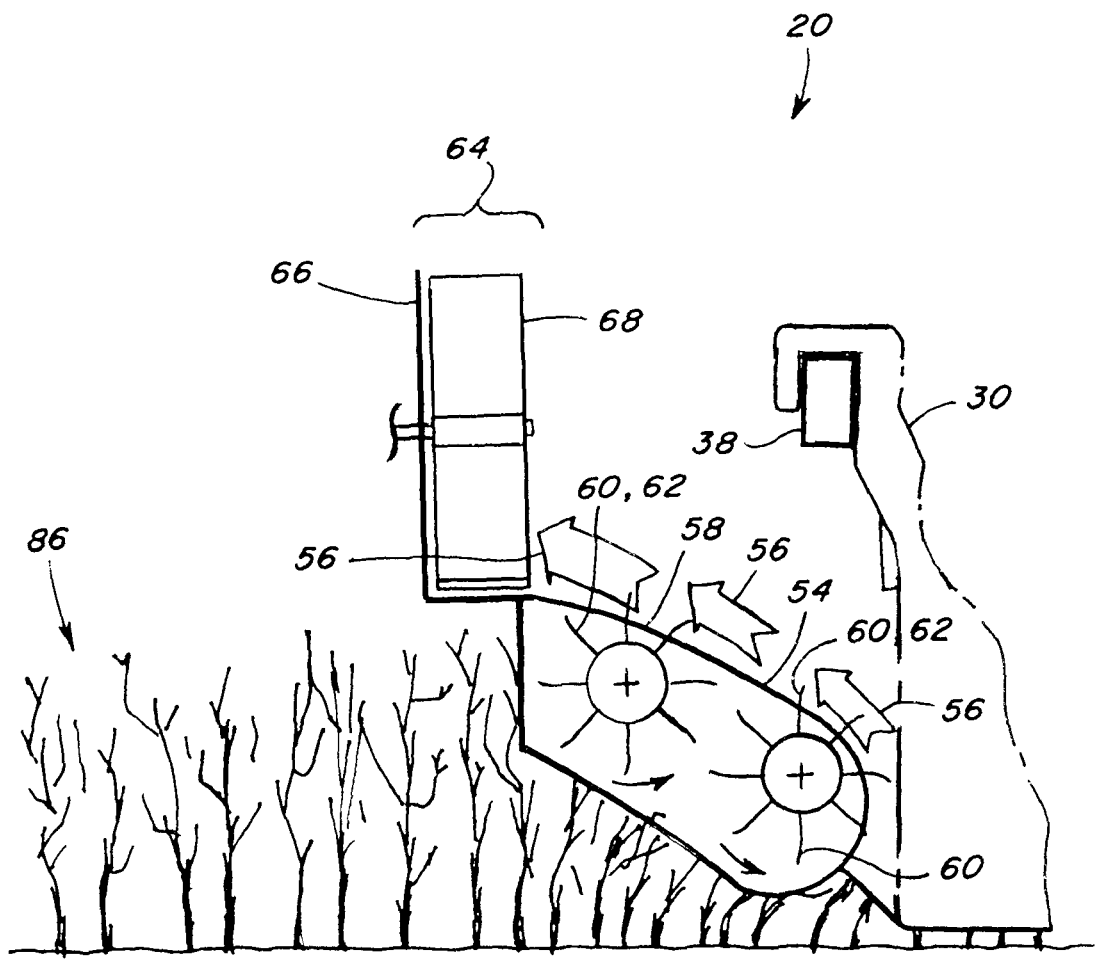
FIG. 4 is a simplified fragmentary side view of the invention of FIG. 1, illustrating aspects of operation thereof.
Figure 5:
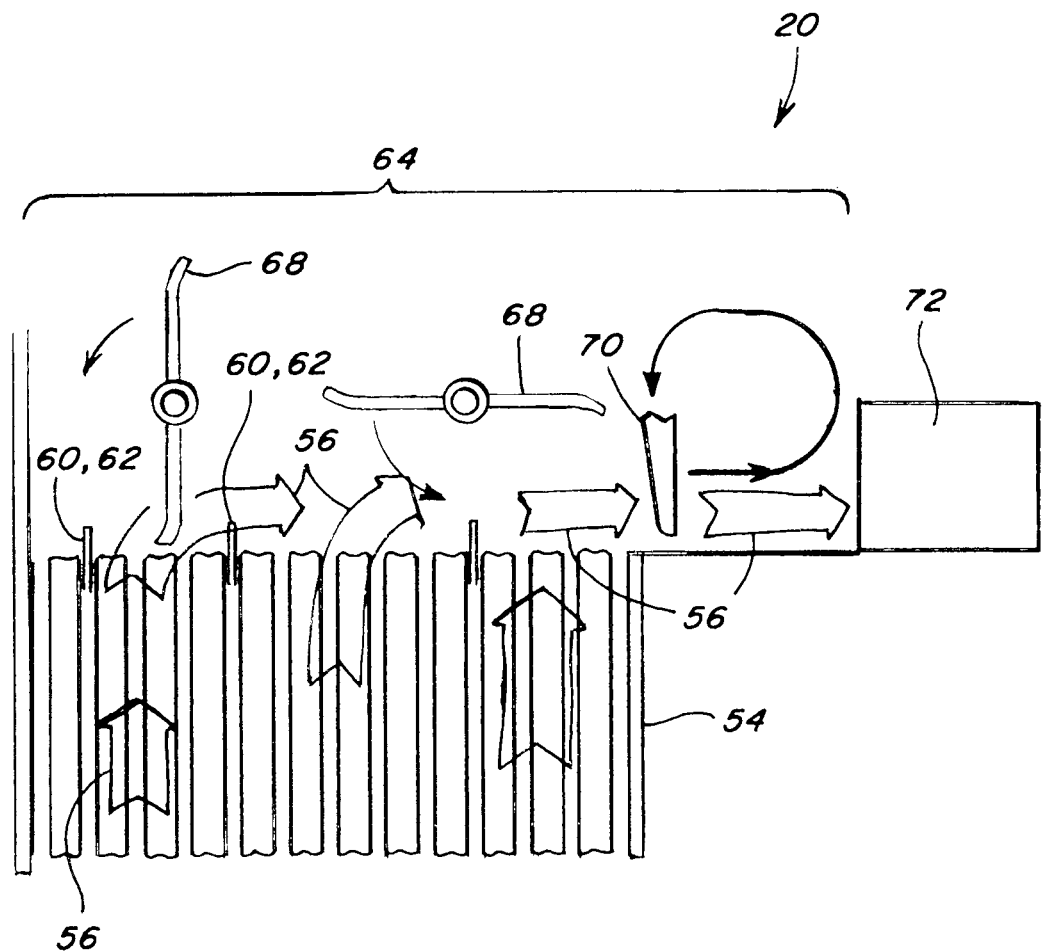
FIG. 5 is a simplified fragmentary front view of conveying apparatus and a baler of the invention of FIG. 1, with the picking units deleted, to show operational aspects of the invention.

Referring also to FIGS. 4 and 5, baler 32 and cotton conveying apparatus 34 in this embodiment essentially comprises a standard baler, pick up and packing mechanism used for hay, straw and other conventionally baled materials, adapted as required for harvesting cotton from rows of plants 86 and handling the picked cotton, which is of a different size and consistency than hay and the like. This is advantageous, as the invention can allow removal of the picking units 30, to allow use of the baler for picking up and baling other materials (see FIG. 10).

Cotton conveying apparatus 34 comprises a first conveyor element 54 for receiving the picked cotton, denoted by arrows 56, from picking units 30. Conveyor element 54 includes a rearwardly and upwardly inclined ramp or platform 58, having powered rotary rakes 60 comprising rows of sidewardly spaced tines or fingers 62 projecting upwardly through channels in platform 58, and rotatable, as illustrated by the associated arrows, rearwardly and upwardly therealong, for carrying cotton 56 to and over a rear edge of platform 58, to a second conveyor element 64.

Second conveyor element 64 extends laterally adjacent to the rear end of platform 58 to baler 32. Second conveyor element 64 includes a housing 66 containing at least one rotary feeder 68 rotatably driven, as illustrated by associated arrows, for conveying or propelling the cotton along the bottom of housing 66 toward a packing fork 70, operable as denoted by the associated arrows, for packing the cotton into a baling chamber 72 of baler 32.

Conveying apparatus 34 can be similar in construction to conveying apparatus of a variety of commercially available balers, but may be adapted as required for handling cotton in lieu of straw, hay and other conventionally baled materials. For instance, a bottom pan and appropriate side and top shielding or covering may be required between picking units 30 and first conveyor element 54 to prevent cotton loss or entry of excessive dust. The bottom pan and/or shielding will be configured to facilitate passage over cotton plants 86 as they exit the rear of the picking units. As another adaptation, rotary feeder 68 and packing fork 70 can include forks which are larger and shaped more like a paddle so as to have greater surface area suitable for propelling the cotton toward and into the baling chamber. Rotary feeder or feeders 68 and reciprocating packing fork 70, as well as rake 60, will be conventionally powered via a drive mechanism, such as a gear train or belt drive, in connection with a drive shaft 36 from tractor 24, in the well known manner.

Baler 32 is essentially of conventional construction and operation, baling chamber 72 being tapered convergingly toward the rear in the well known manner. Tapered walls 74 defining the rear of the chamber, as well as an existing predecessor bale, and wires or other packaging, will contain the cotton as a new bale is compacted within the chamber, in a manner essentially the same as that used for forming straw and hay bales. A reciprocating packing mechanism 76 at the forward end of baler 32 is powered by the power takeoff of tractor 24 via a drive shaft 36, or an auxiliary power unit or the like, and includes a conventional plunger reciprocatingly movable toward the rear of chamber 72 by a cranking action for compacting cotton therein into a cohesive, unitary bale 84. The plunger and packing fork 70 of conveyor element 64 will preferably operate in timed relation, to allow for entry of cotton from conveyor element 64 into chamber 72 in advance of rearward strokes of the plunger. Just after or as a bale is completed, it will preferably be automatically packaged with a suitable packaging material, such as wire or twine, denoted by number 78, by a conventional baling mechanism 80, which can include, for instance, including a knotter of well known construction, or by a wrapping mechanism. Alternatively, it is contemplated that the finished bales can be manually packaged or tied, to reduce costs and complexity. Baler 32 and cotton conveying apparatus 34 can comprise, for instance, a commercially available 4000 or 5000 Series Square Baler, made by New Holland Agriculture, of New Holland, Pa., USA.

Baler 32 shown is equipped with a rear ramp 82 for dropping the finished cotton bales 84 successively onto the ground or another surface, or an accompanying vehicle, as desired. Alternatively, a bale stacker, power feeder or thrower, or the like can be employed, if desired.

Figure 6:
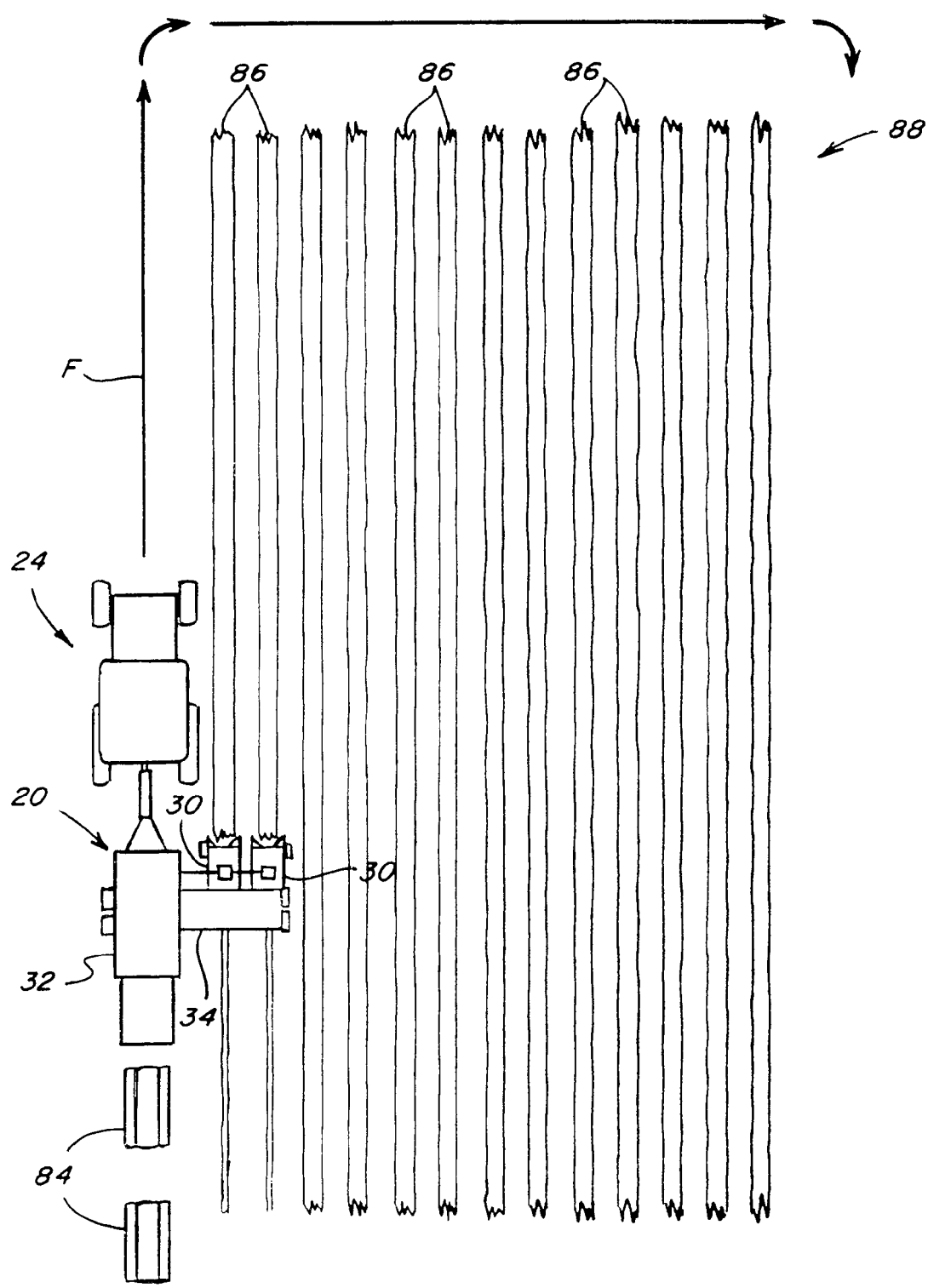
FIG. 6 is a top view of the harvester and baler being towed by a tractor over a field of cotton plants.

Referring also to FIG. 6, harvester and baler 20 is shown moving in a forward direction F for harvesting cotton from rows of cotton plants 86 of a field 88. It can be observed that picking units 30 are positioned and spaced apart for the particular row spacing of the field being harvested.

Figure 7:
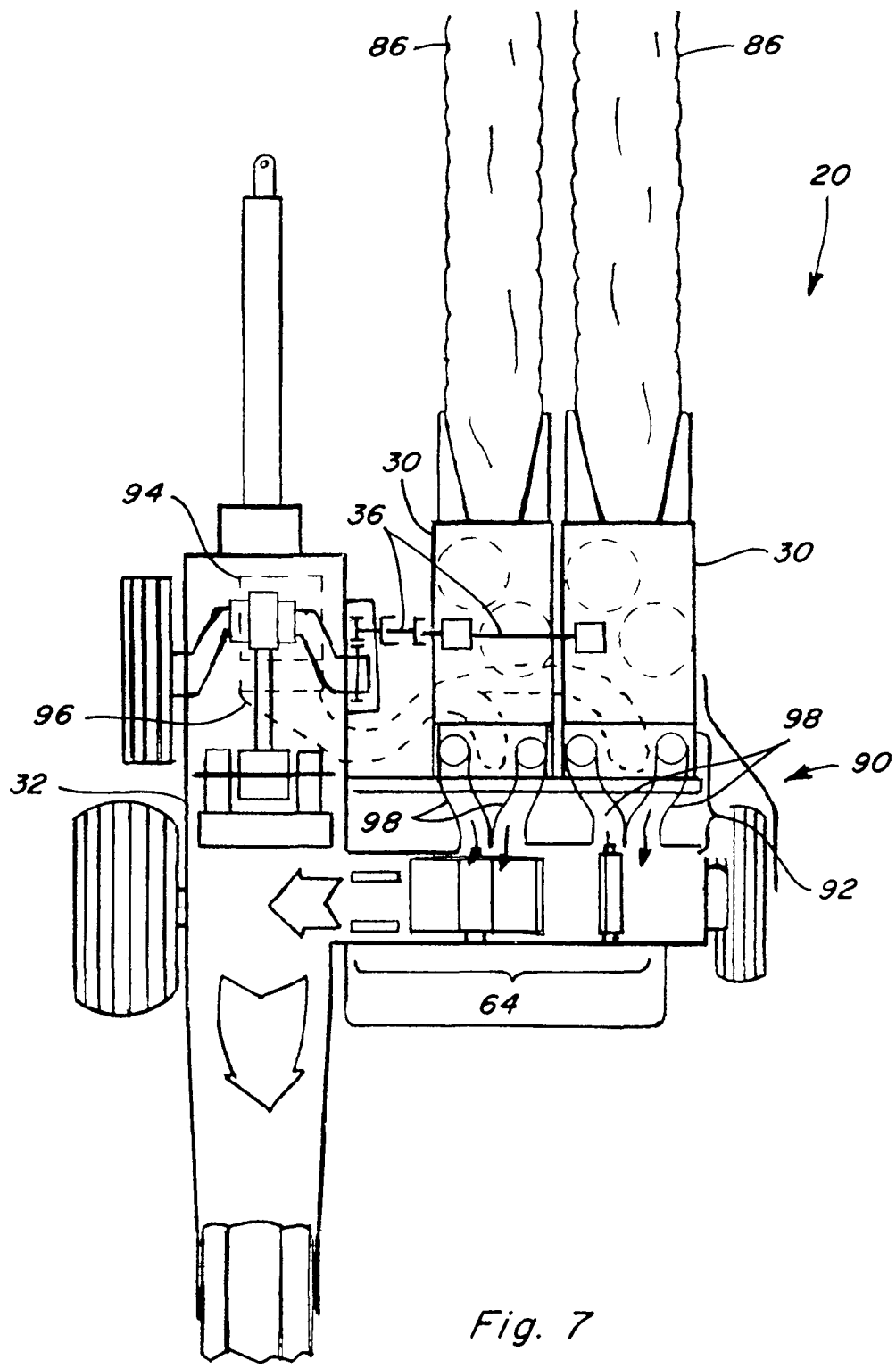
FIG. 7 is a simplified top view of another embodiment of a cotton harvester and baler according to the invention, illustrating operational aspects thereof.
Figure 8:
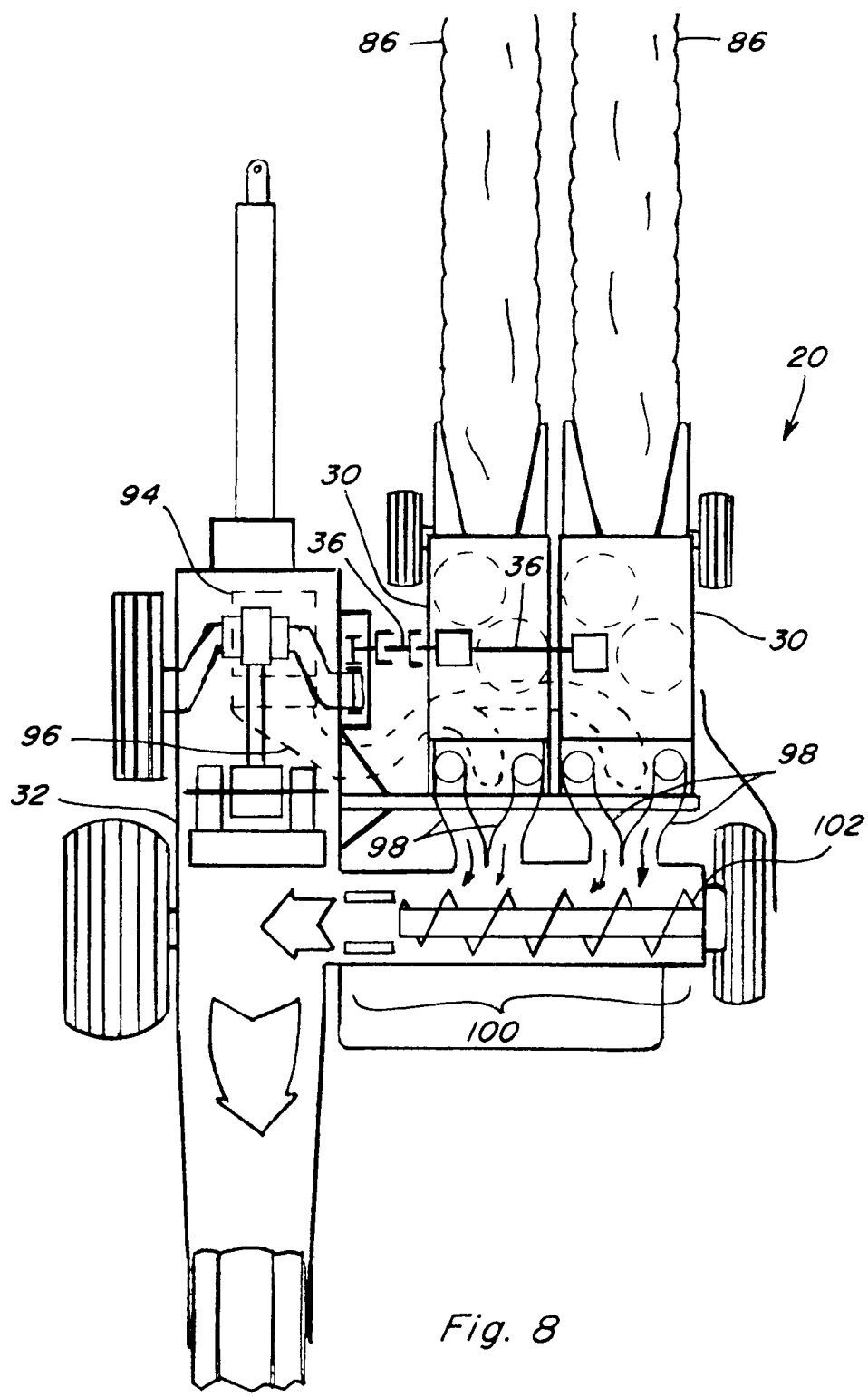
FIG. 8 is a simplified top view of the invention of still another embodiment of a cotton harvester and baler according to the invention, illustrating operational aspects thereof.
Figure 9:
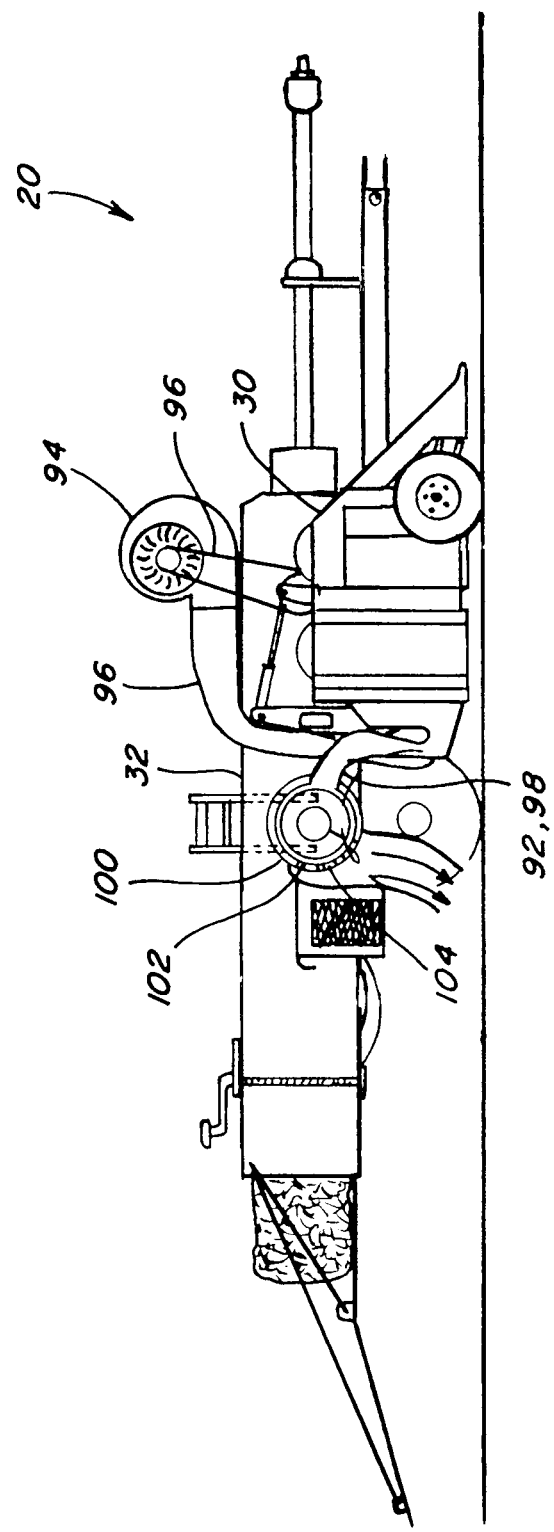
FIG. 9 is a simplified side view of the invention of FIG. 8.

Referring also to FIGS. 7, 8 and 9, it is contemplated that cotton harvester and baler 20 can be adapted to include alternative cotton conveying apparatus for conveying the picked cotton to baler 32. As a first alternative, referring in particular to FIG. 7, cotton conveying apparatus 90 is shown comprising a first conveyor element 92 which is pneumatic. Conveyor element 92 includes a fan 94 (see also FIG. 9) located at a suitable location such as atop baler 32, suitably rotatably driven, such as by a belt drive 96 shown, a fluid or electric motor, or the like. Air ducts 96 extend from fan 94 to the rears of picking units 30, respectively, and carry flows of air thereto for picking up the picked cotton. From there, ducts 98 can extend directly to a second conveyor element 64, constructed generally in the above described manner, for carrying the picked cotton airborne in the flows of air to that conveyor element (FIG. 7), or to a second conveyor element 100 comprising, for instance, a helical auger 102. The housing of the second conveyor element 64 or 100 can be provided with suitably located vents 104 for discharging the air flow generated by the pneumatic system, as denoted by the arrows.

As still another contemplated alternative, portions or all of the second conveyor apparatus may be eliminated and the pneumatic apparatus utilized for directing the picked cotton directly to a packing fork 70, or directly into baling chamber 72.

Figure 10:
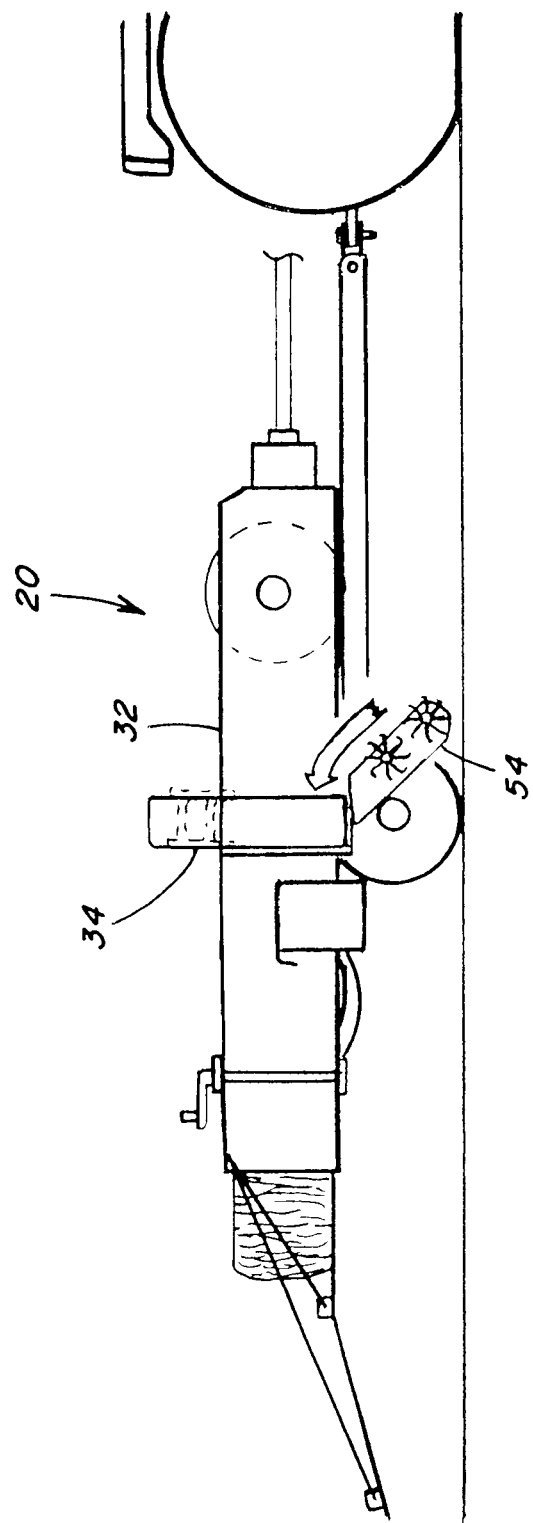
FIG. 10 is another simplified side view of the invention of FIG. 1, with the cotton picking units removed to allow use as just a baler.

Referring also to FIG. 10, harvester and baler 20 is shown with picking units 30 removed in an optional configuration, to allow use for raking or picking up and baling other materials, such as straw, hay, and the like in the known manner. It is contemplated in this regard that at least the first conveyor element 54 of the conveying apparatus 34 (or the baler 32 also) will be lowered to bring the front edge of first conveyor element 54 in proximity to a surface therebelow for raking the material therefrom in the conventional manner.

Referring again to FIG. 11, as noted above, drivers 40 in connection with lift arms 106 are adjustable for varying the height of the overall harvester and baler 20, or just the forward drivers 40 can be adjusted to tilt the picking units 30, or the first conveyor element 54, e.g., more downwardly, at the front end, as may be advantageous for a particular harvesting operation. Wheels 42 can also optionally be swivel type wheels to facilitate easier maneuvering. It should be noted that the apparatus shown for varying the height of the harvester and baler of the invention, including a lift arm mechanism 106, is just one of a variety of mechanisms that can be used. Other examples include a scissors mechanism, telescoping mechanism, screw jack, hydraulic jack, or the like. Drivers 40 here are illustrated as fluid cylinders that can be supplied with pressurized fluid from source such as a hydraulic circuit on a towing vehicle for automatic operation, but alternatively could comprise other devices such as, but not limited to, manually operable turnbuckles, for simplicity and lower cost.

As another aspect of the invention, it is contemplated that picking units 30, baler 32, and/or conveying apparatus 34, can be powered in a number of alternatives to the power takeoff of a towing vehicle. As a non-limiting example, it is possible that an auxiliary power unit could be carried on the invention itself, such as a petrol or diesel powered engine. This would also facilitate pulling the harvester and baler using an alternative such as a draught animal or animals.

In light of all the foregoing, it should thus be apparent to those skilled in the art that there has been shown and described a novel cotton harvester and baler. However, it should also be apparent that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. A cotton harvester and baler, comprising:
a support frame supported by ground engaging elements for movement over the ground and configured to be towed by a vehicle, the support frame carrying at least one mechanized cotton picking unit configured for receiving standing cotton plants and harvesting the cotton therefrom;
a mechanized baler configured to be towed by the vehicle, the baler including an internal baling chamber adapted for receiving the picked cotton, compacting apparatus configured for compacting the cotton within the baling chamber into unitary bales and successively discharging the bales from the chamber, and cotton conveying apparatus extending between the at least one picking unit and the baler, configured and operable for receiving the picked cotton from the at least one picking unit and conveying the received cotton to the baling chamber of the baler for compaction by the compacting apparatus; and
wherein the at least one picking unit is removable to allow use of just the conveyor apparatus and the baler in a second configuration such that at least a portion of the conveying apparatus is positioned at second height for engaging crop located on the ground such that crop material is transported by the conveyer apparatus from the ground toward the baling chamber.

2. The cotton harvester and baler of claim 1, wherein the at least one cotton picking unit being disposed to discharge the picked cotton rearwardly therefrom onto a first conveyor element of the cotton conveying apparatus, the first conveyor element being supported by the support frame and configured and operable for conveying the picked cotton upwardly and rearwardly to a second conveyor element of the conveying apparatus, and the second conveyor element being configured and operable for conveying picked cotton sidewardly across the width of the first conveyer element toward chamber of the baler.

3. The cotton harvester and baler of claim 2, wherein the first conveyor element comprises a platform disposed for receiving the picked cotton from the at least one cotton picking unit, and moving rakes having tines that extend upwardly through the platform, the tines configured and operable for moving upwardly and rearwardly.

4. The cotton harvester and baler of claim 2, wherein the second conveyor element comprises an auger.

5. The cotton harvester and baler of claim 2, wherein the second conveyor comprises rotary feeder apparatus including at least one rotatable feeder rotor configured and operable for feeding the picked cotton to at least one moving packing fork configured and operable for conveying the picked cotton into the baling chamber.

6. The cotton harvester and baler of claim 1, wherein the cotton conveying apparatus comprises a pneumatic conveyor such that a flow of air from a fan is directed at the crop received from the picking unit in the direction of the baling chamber.

7. The cotton harvester and baler of claim 1, wherein the at least one cotton picking unit is carried on the support frame beside the baler wherein the baler and cotton picking unit are supported by the same frame.

8. The cotton harvester and baler of claim 7, wherein the at least one cotton picking unit is adjustable in elevation jointly with the baler.

9. The cotton harvester and baler of claim 1, wherein the at least one cotton picking unit includes a support wheel for supporting the unit.

10. The cotton harvester and baler of claim 1, wherein at least a portion of the conveying apparatus is adjustable in elevation to allow alternately configuring for operation with the at least one picking unit, and for raking material from a surface below the conveying apparatus.

11. A cotton harvester and baler including a support frame supported on wheels or tracks for movement over the ground and configured to be towed by a vehicle, the support frame carrying a baler including an internal baling chamber, compacting apparatus configured for compacting the material within the baling chamber into unitary bales and successively discharging the bales from the chamber, and conveying apparatus beside the baler, including a rake configured and operable for conveying material rearwardly and upwardly along a surface thereof and sidewardly into the baling chamber,
wherein in a first configuration at least one mechanized cotton picking unit removably carried on the support frame and positioned and operable for picking cotton from standing cotton plants and depositing the cotton onto the surface of the conveying apparatus for raking rearwardly and upwardly thereby, wherein the at least one picking unit can be removed, to allow adapting the conveying apparatus, wherein in the first configuration the conveyer apparatus is at a first height and configured to receive crop material from the at least one picking unit located forward of the conveying apparatus and in a second configuration with the at least one unit removed the conveyer apparatus is located at a second lower height and configured as a crop pickup to lift material from a surface therebelow for baling by the baler.

* * * * *